Jan. 20, 1970

G. E. GOULD 3,490,097

FLIGHTED EXTRUDER

Filed Feb. 16, 1968

INVENTOR.
Gordon E. Gould
BY Sidney J Walker
ATTORNEY

Jan. 20, 1970     G. E. GOULD     3,490,097
FLIGHTED EXTRUDER
Filed Feb. 16, 1968     3 Sheets-Sheet 2

INVENTOR.
Gordon E. Gould
BY Sidney Walker
ATTORNEY

Jan. 20, 1970  G. E. GOULD  3,490,097

FLIGHTED EXTRUDER

Filed Feb. 16, 1968  3 Sheets-Sheet 3

INVENTOR.
Gordon E. Gould
BY Sidney J. Walker
ATTORNEY

United States Patent Office 3,490,097
Patented Jan. 20, 1970

3,490,097
FLIGHTED EXTRUDER
Gordon E. Gould, Breckenridge, Mich., assignor to The Dow Chemical Company, Midland, Mich., a corporation of Delaware
Filed Feb. 16, 1968, Ser. No. 706,131
Int. Cl. B29f 3/02
U.S. Cl. 18—12                                15 Claims

ABSTRACT OF THE DISCLOSURE

A new and useful extruder is described. This extruder is of centripetal design and comprises blades or flights positioned between shear faces, said blades completely wiping opposing shear faces at an angle to their radii to provide an immediate and a faster extrusion rate. The design permits a multiple unit model and one which is capable of coextrusion of multilayered materials with no rate loss.

BACKGROUND OF THE INVENTION

Field of the invention

This invention relates to apparatus for the extrusion of thermoplastic material, and more particularly to a plasticizer-extruder whose novel design maximizes the drag-flow effect that is obtained in a disc type extruder, thereby minimizing degradation of the extruded material.

Description of the prior art

In conventional extruders, a flight is wrapped helically around a relatively narrow cylinder and the rotation of this cylinder inside another cylinder provides the necessary pumping and melting action. However, this type of extruder is disadvantaged in the extrusion of heat sensitive materials such as sarans and vinylidene chloride polymers in that degradation of the materials takes place, causing stagnate material to accumulate. This occurs generally at the root of the flight because of the zero velocity and higher temperature attendant there.

With the development of the elastic melt or centripetal extruder, the problem is somewhat alleviated. In this type extruder, one flat plate rotates concentrically with an orifice in another flat plate whereby the viscous or visco-elastic properties of the extruded material cause a pressure component toward the orifice. This component is not large, however, and much of the action is caused by shear, creating higher temperatures. With low velocities near the surfaces of each disc, excessive degradation of the heat-sensitive materials results.

Later improvements in centripetal extruders increase the pressure developed at a shearing gap, supplementing it with mechanical pressures developed by forcing the material through a helical path of decreasing cross-sectional area toward a central orifice. This type of elastic melt extruder utilizes a fixed shearing face and a rotatable shearing face, one of which has a radially inner portion describing the helical path. Compaction of the material still causes melting at a time when the forwarding of the material toward the central orifice is at its slowest. Degradation of the material results which causes blockage, stagnate areas, and hang-up of apparatus when changing from one feedstock to another. The local residence time is less than that in a flat plate extruder, but the speed of extrusion is still not optimized.

SUMMARY OF THE INVENTION

This invention replaces present extruders through the use of novel blade assemblies which extend contiguously with the shear faces and which are independent of the opposing faces and rotatable relative thereto, thereby increasing almost two-fold the forwarding speed of the material to the orifice. The novel design permits a multiple unit version for increased output while avoiding high axial forces from internal pressures and also a multiple plate version for coextrusion of multi-layered materials. This insures low overall residence time of material in the extruder and eliminates the need of a heavy thrust bearing. Moreover, less dependence on pressure generated by shear plus continual "wiping" of the shear surfaces by the extended blades means a marked decrease in degraded material. As the blade is moving relative to the opposing shear surfaces, the energy per pound of output developed by viscous shear is decreased. This is because the average velocity is now equal to the difference between the blade and the surfaces. Where the blade is attached to one surface, the average velocity is equal to about one-half the difference in velocity between one surface and the other. My invention results in more forwarding for the same total shear, on the approximate order of a 2:1 improvement. With heat sensitive materials such as polyvinyl chloride, polyvinylidene chloride and the like, having the polymer above the melting point for the shortest time possible is especially important.

In addition to the reduction of shear energy per pound of material extruded, there is another very important advantage to be realized by rotating the blades with respect to both shear surfaces; in the flat plate or disc type extruder there is a layer of material near the surface of each disc, which is moving towards the centerline with a very low velocity even if the average velocity is quite high; in the case of heat sensitive materials this layer will degrade and contaminate the product. In the case of the extruders with a blade attached to one of the surfaces, the surface to which the blade is attached cannot be operated at a temperature higher than the temperature at which the unmelted material begins to stick to the surface. If the unmelted material sticks to this surface, it will interfere with the forwarding capacity of the device at the very least, and in the case of heat sensitive materials, the non-moving material will also eventually degrade. If the temperature of the surface is operated below the "stick" point of the material (which is usually well below the melting point of the material) much of the heat transfer capacity of the device is sacrificed; in addition, with heat sensitive material, the polymer that melts in the earlier stages will freeze on the surface, and again degradation will occur. With the blades wiping both surfaces, both surfaces can be operated well above the melting point without allowing material to stagnate and degrade.

Another important advantage over normal extrusion is the ability to eliminate all "passive" weld lines. In a normal tubular extrusion die it is necessary for the extrudate stream to be split into two or more streams by the post or spiders which are essential for the support of the center shaft of the tube die. When the streams are joined together again after passing the post or spiders, quite frequently an undesirable effect is seen such as a line of non-uniform thickness or of discoloration. In some extreme cases, such as extruding very high molecular weight polyethylene, it may be extremely difficult to even get the streams to weld together at all. The major reason for this difficulty is that the rejoining of the streams is completely passive, i.e., there is no active element contributing to the rejoining. My invention completely eliminates the passive weld lines. At the end of each blade (3a) there is a weld line which is actively "smeared" by the advancing blade. This permits extrusion in tubular form of materials heretofore difficult or impossible to process.

It is an object of this invention therefore to provide a novel extruder which produces lower shear energy per pound of extrudate.

It is another object of this invention to provide an extruder whose novel design minimizes thermal degradation.

It is a further object of this invention to provide a novel extruder which provides for continuous and complete cleaning of opposing shear faces.

It is a further object of this invention to provide an extruder whose novel design permits multiple shear faces for increased output while avoiding high axial forces from internal pressures.

It is yet another object of this invention to provide a novel extruder which is capable of coextrusion or simultaneous extrusion of multi-layered plastic materials with controlled layer thickness and at increased speeds.

Other objects of this invention will appear in the following description and claims, reference being had to the accompanying drawings forming a part of this specification.

BRIEF DESCRIPTION OF THE DRAWINGS

Preferred embodiments of the invention are shown in the drawings, wherein.

DESCRIPTION OF THE PREFERRED EMBODIMENTS

Figure 1:
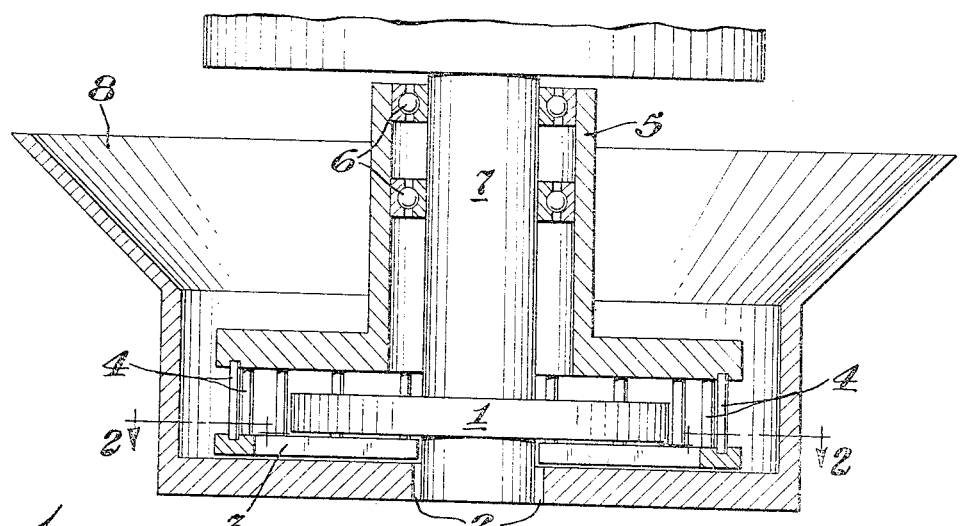
FIGURE 1 is a vertical sectional view taken through a single plate version of the novel extruder.

Looking now with more particularity at the drawings, FIG. 1 shows the single plate version of the invention in vertical section. By "single plate," I refer to the fact that it has only one blade or flight assembly interposed between two shearing plates. As shown in this embodiment, the shearing plates are stationary. Interposed between the shear faces of plates 1 is the rotating blade assembly 3 which is connected to drive shaft 5 by pins or spaced support members 4. The drive shaft 5 rotates around center shaft 7 by use of bearing means 6 and motor means (not shown). Completing the extruder is hopper or supply means 8 for the receipt of material to be heat plastified and extruded, and annular die 2 through which the material is tubularly extruded. It should be understood that while all embodiments shown herein are portrayed employing an annular die, by no means is my invention restricted to such die use.

Figure 2:
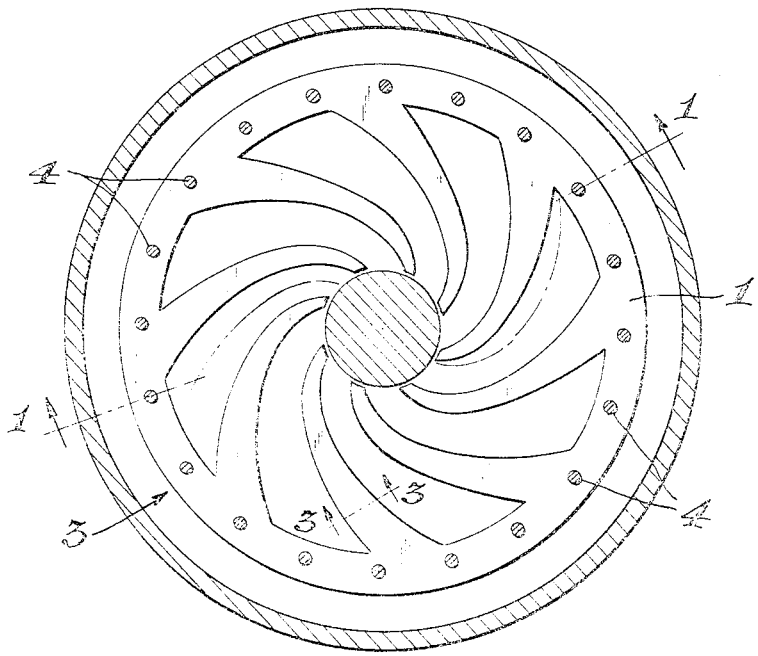
FIGURE 2 is a sectional view taken along the plane 2—2 of FIGURE 1.

FIG. 2 shows the configuration of rotating blade assembly 3 and the positioning of pins 4 along with plates 1. The leading edges are configured to cut across the radii of the assembly at an angle so as to assist in drawing the plastic material towards the central die. Although a plurality of arms are shown, the invention would operate with as little as one arm provided the configuration criteria were met.

Figure 3:
FIGURE 3 is a sectional view taken along the plane 3—3 of FIGURE 2.

FIG. 3 shows the section of a radial arm 3a of the blade 3 wherein the leading edge is further configured to provide a streamlined flow of material during the wiping of the shear faces and thereby prevent stagnant areas from forming thereon.

Figure 4:
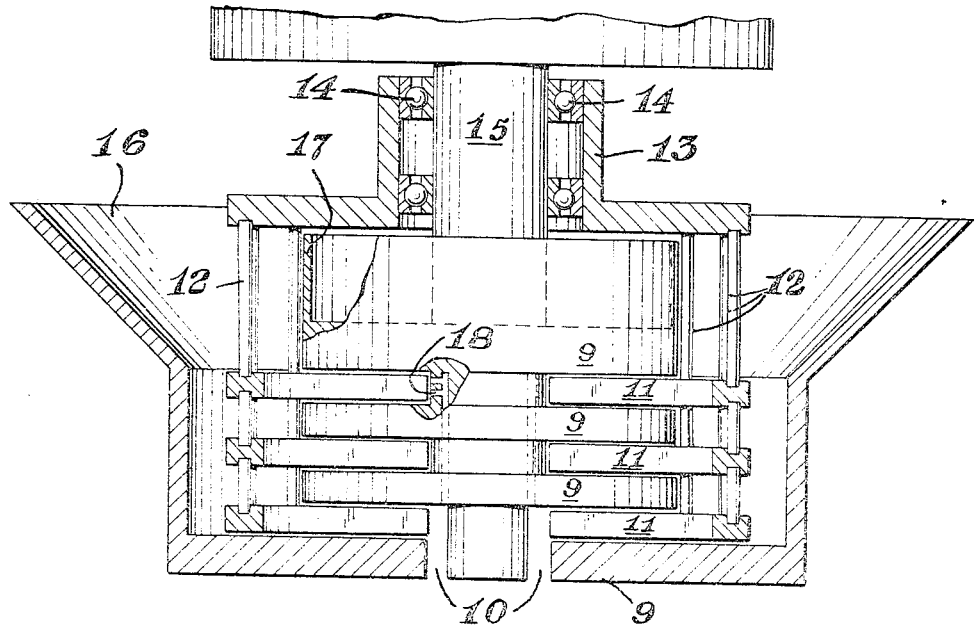
FIGURE 4 is a vertical sectional view taken through a multiple plate version of the extruder.

FIG. 4 shows a multiple plate embodiment of my invention wherein three rotating blade or flight assemblies are interposed between four fixed shearing plates 9. These blade assemblies 11 are of the same configuration as shown in FIGS. 2 and 3. The assemblies are connected to drive shaft 13 by pins 12. The drive shaft rotates around center shaft 15 by use of bearing means 14 and motor means (not shown). Completing the extruder is hopper 16 and annular die 10 through which the material is tubularly extruded. Feeding into annular die 10 are a series of outlets 18 encircling die 10, said outlets 18 juxtaposed at the hub of all upper blade assemblies 11. Circular shield 17 is shown in this embodiment and could be employed in all other embodiments where design necessitated such a shield to prevent particulate material from accumulating in unwanted areas.

Figure 5:
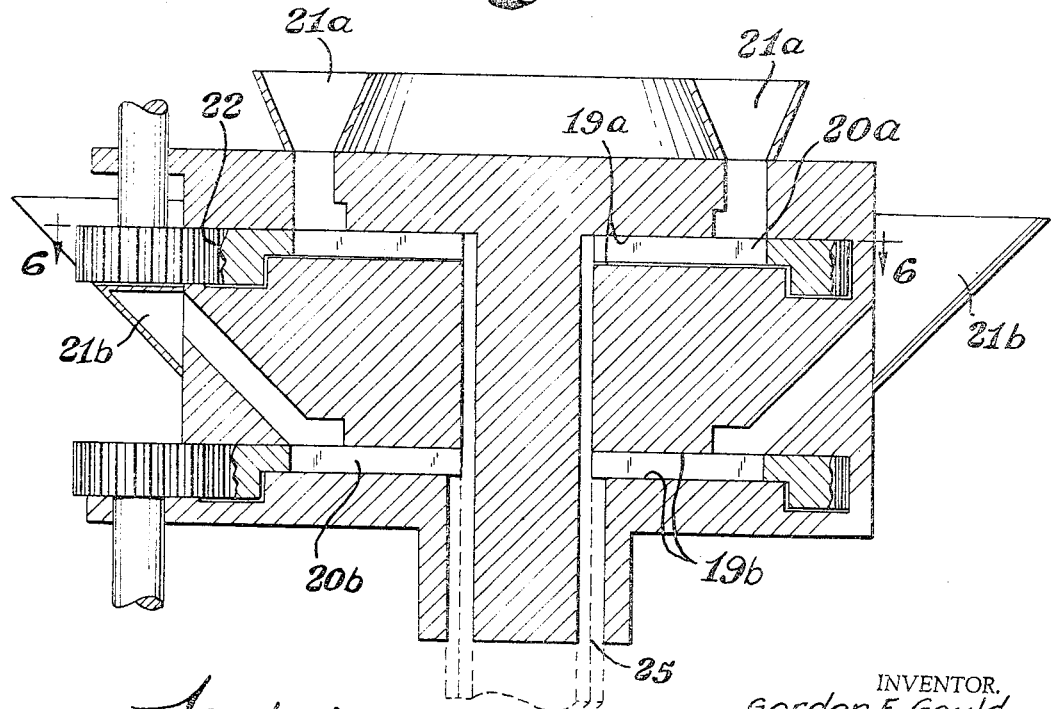
FIGURE 5 is a vertical sectional view taken through a multiple plate version of the extruder for use in coextrusion of multi-layered materials.

FIG. 5 shows yet another novel embodiment of my invention wherein a multiple plate version is successfully employed to coextrude multi-layered materials. In this embodiment, the blade assemblies 20a and 20b are fed first and second plasticizable materials by separate hoppers, shown as 21a and 21b. The blade assemblies 20a and 20b rotate between fixed shearing faces 19a and 19b, through interaction of ring gears 22 with spur gears 23 which rotate with separate drive shafts 24a and 24b by use of separate motor means (not shown). The plasticized material in each case is moved to the center of the respective assemblies where they are extruded into annular orifice 25.

Figure 6:
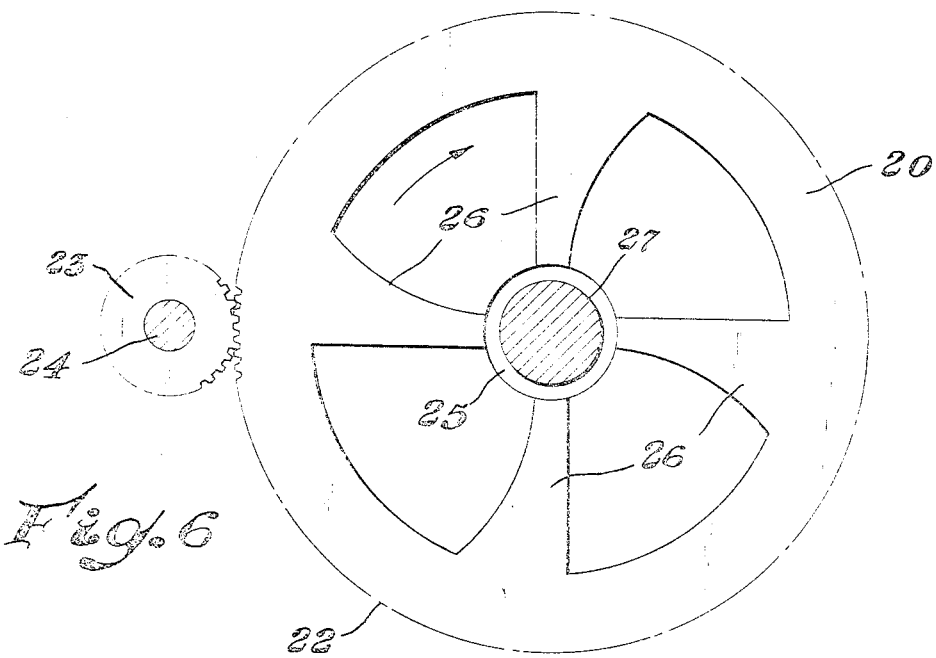
FIGURE 6 is a sectional view taken along the plane 6—6 of FIGURE 5.

FIG. 6 shows a type of blade arm assembly which can be employed with the multiple plate-multiple layered version of my invention. Four blade arms 26 are shown having their leading edges configured at an angle across the radii of the assembly, which interact with the relative, rotative motion (in this case the rotative motion of the blade assembly) to produce a movement of the plastic material towards the hub of the assembly 27 and the annular orifice 25.

Figure 7:
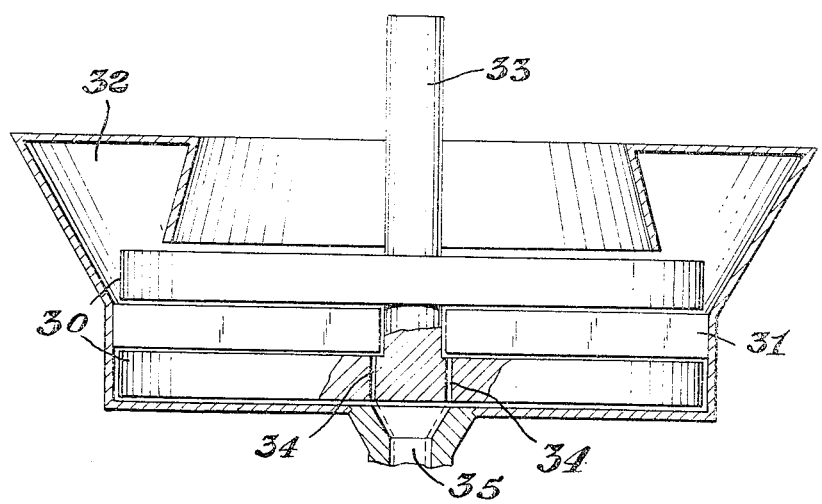
FIGURE 7 is a vertical sectional view taken through a single plate version of the novel extruder having a different drive mechanism.

FIG. 7 shows yet another version of my invention. In it, the blade assembly 31 is fixed, although its configuration is substantially the same as shown in FIGS. 2 and 3. The shearing plates 30 rotate in the same direction (opposite in direction to the streamlined leading edge of the radial arms of the blade assembly), through action of drive shaft 33 to which the plates 30 are connected and motor means (not shown). 32 represents the hopper into which the particulate plastic material is fed. The plasticized material is forced through holes 34 disposed around the center of the lower shearing plate and into annular die 35 for tubular extrusion, although as previously pointed out, the type of die is immaterial to the invention. This version can also be employed in multiple plate versions and in multiple plate versions for coextrusion of multi-layered materials.

The operation of the apparatus as above described is as follows: With respect to the single plate version shown in FIG. 1, solid thermoplastic material to be extruded is fed into hopper 8 and enters the periphery of the blade assembly 3 whose rotating action and blade arms 3a, cutting across the radii, draw the material into shearing area defined by the opposing shearing faces of plates 1 interacting with rotating blade assembly 3. The configuration of the leading edges of the blade arms 3a along with the wiping action of the arms on the complete surfaces of the shearing faces of both plates, moves the material with ever increasing pressure until it is plasticized at which approximate time it is discharged through the orifices of annular die 2. Motor means (not shown) provide the rotating force through drive shaft 5 rotatably supported by bearings 6 and pins or spaced supporting members 4. It is evident from this action that little or no material will be left to stagnate or degrade because of the speed of movement of the material and the constant wiping of all shear faces by the streamlined leading edges of arms 3a.

The operation of the multiple plate version shown in FIG. 4 is much the same, except that more material can be extruded in the same time as in the single plate version with little increase in high axial forces resulting from internal pressures. The particulate material enters via hopper 16 and feeds into the three rotating blade assemblies 11, is forced in between shearing faces of plates 9 and progressively moves to orifices 18 and thence to extruder die 10. The drive mechanism 13 working from bearings 14 and motor means (not shown), revolves all blade assemblies 11 simultaneously around center shaft 15 via pins 12 which connect the periphery of the blade assemblies. 17 represents a baffle to keep material from collecting atop upper shear plate 9.

The operation of the multiple plate version for coextrusion of multi-layered materials shown in FIG. 5 depends on drive means 24a and 24b operating from motor means (not shown) working through gear means 23a and 23b and spur gears 22a and 22b to rotate blade assemblies 20a and 20b between pairs of shear faces 19a and 19b. A first plasticizable material is fed into circular hopper 21a and into the areas between the blade arms of blade assembly 20a. As the blade assembly rotates, the leading edges of the arms being configured at some angle to the radii of the assembly draw the material toward the annular orifice 25 bringing the material in contact with the shear faces 19a. The material is plasticized and forced into annular outlet 25 through this interaction. Annular outlet 25 widens in thickness at the junction of blade assembly 20b with said outlet. Meanwhile, a second plasticizable material is fed into circular hopper 21b and into the areas between the blade arms of blade assembly 20b. Rotation of this blade assembly which has its leading edges at an angle to the radii of the assembly forces this material toward the center and into interplay with shear faces 19b. A tubular, plasticized layer of this second material is formed in annular outlet 25 as an outer layer to the tubular plasticized layer of first material. The thickness of each of these layers is controlled by the speed of blade assemblies which are in turn controlled by independent motor means (not shown). The tubular double layer is then extruded through an annular die (not shown). Layer thicknesses can also be controlled by feed rates into hoppers 21a and 21b. The dimensions and geometry of the blade assemblies also influence throughput rate and consequently thickness of the layers. Although not shown, it is obvious that more blade assemblies operating from independent drive means and being fed from independent hoppers can be employed to increase the number of layers of various plasticizable materials to be extruded. Further, hoppers can be designed to feed a plurality of alternating blade assemblies so as to effect, for example, a tubular extrusion comprising of various plasticized materials in such order as ABCBA, wherein one hopper feeds plastic material A to two blade assemblies separated by three other blade assemblies, while a second hopper feeds plastic material B to two of these intermediate blade assemblies which are in turn separated by the middle-most assembly which is fed plastic material C by a third hopper. In the same mode, scores of other layer configurations may be obtained. Obviously, this particular species of my invention is not restricted to tubular configurations but may be used to produce layered sheets of plasticized materials simply through the use of other die designs.

Another type of extruder embodying my invention is shown in FIG. 7 wherein the shearing plates are rotated by the center shaft 33 which is driven by motor means (not shown), while the blade assembly 31 is fixed. Rotation of both plates 30 is in the direction opposing the leading edges of assembly arms 3a which are as shown in FIG. 3. As the thermoplastic material is fed into hopper 32, it is moved by the interaction of the shearing faces and the blade assembly towards the center where the then heat plasticized material flows through orifice 34 into annular die 35. It is to be understood that this principle of rotating shear plates and fixed blade assembly can be equally applied to my multiple plate versions shown in FIGS. 4 and 5 as well.

The above description of the invention along with the accompanying drawings are for the purpose of illustrating the preferred embodiments, and it is to be understood that changes may be made in the structural details and application of same without departing from the scope of this invention.

Thus for example, processes for extruding thermoplastic material other than that employing an annular die can successfully employ this invention as well as versions using more than three blade assemblies in any one configuration; moreover, other blade configurations and designs can be employed using my invention other than those shown, provided, inter alia, the leading edges of the blades are at an angle to the radii of the assembly. By leading edges, I mean those edges which first contact the plasticizable material due to the relative rotative motion between the assembly and the shearing faces or plates, regardless if it is the assembly that is in motion or faces or plates that are in motion.

What is claimed is:

1. In an extruder, a pair of opposing shear plates in spaced relationship to each other, said plates having opposing faces, a blade assembly imposed therebetween in a shearing gap defined by said opposing faces, the said plates and said blade assembly having a common central axis, said faces extending generally radially from said axis, said shearing gap communicating with peripheral feed means and central extrusion means for plasticizable material, said blade assembly extending axially to cooperate with the said opposing faces of said plates, and said blade assembly being rotatable relative to said shear plates in a plane generally normal to said common axis.

2. In an extruder as in claim 1 wherein the said blade assembly comprises at least one blade, said blade having a leading edge at an angle to the radii of said blade assembly whereby the said plasticizable material is moved inwardly towards said axis, said blade extending outwardly to at least the perimeter of said opposing shear faces.

3. In an extruder as in claim 1 wherein said pair of opposing shear plates are stationary and said blade assembly is rotatable.

4. In an extruder as in claim 3 wherein said blade assembly comprises at least one blade, said blade having a leading edge at an angle to the radii of said blade assembly whereby said plasticizable material is moved inwardly towards said axis, said blade extending outwardly to at least the perimeter of said opposing shear faces.

5. In an extruder as in claim 1 wherein said pair of opposing shear plates are rotatable in the same direction and said blade assembly is fixed.

6. In an extruder as in claim 5 wherein said blade assembly comprises at least one blade, said blade having a leading edge at an angle to the radii of said blade assembly whereby said plasticizable material is moved inwardly toward said axis, said blade extending outwardly to at least the perimeter of said opposing shear faces.

7. In an extruder, at least three shear plates in spaced relationship to each other, each contiguous pair of shear plates having opposing faces, a blade assembly imposed in the shearing gap defined by each pair of said opposing faces, said plates and said blade assemblies having a common, central axis, said faces extending generally radially from said axis, each of said shearing gap communicating with peripheral feed means and central extrusion means for plasticizable material, each said blade assembly extending axially to cooperate with each pair of said opposing faces, and each said blade assembly being rotatable relative to said shear plates in a plane generally normal to said axis.

8. In an extruder as in claim 7 wherein said shear plates are fixed and said blade assemblies are rotatable.

9. In an extruder as in claim 8 wherein said blade assemblies each comprise at least one blade, said blade having a leading edge at an angle to the radii of said blade assembly whereby said plasticizable material is moved inwardly towards said axis, each said blade extending outwardly to at least the perimeter of said opposing shear faces.

10. In an extruder as in claim 7 wherein said shear plates rotate in the same direction and said blade assemblies are stationary.

11. In an extruder, at least three shear plates in spaced relationship to each other, each contiguous pair of shear plates having opposing faces, a blade assembly imposed in the shearing gap defined by each pair of said opposing faces, said plates and said blade assemblies having a common, central axis, said faces extending generally radially from said axis, separate peripheral feed means for plasticizable materials communicating with each said shearing gap, each said assembly extending axially to cooperate with each pair of said opposing faces, each said blade assembly being rotatable relative to said shear plates in a plane generally normal to said axis, and common, central extrusion means communicating with each said shearing gap.

12. An extruder as in claim 11 wherein said shear plates are fixed and said blade assemblies are rotatable.

13. An extruder as in claim 12 wherein said blade assemblies each comprise at least one blade, said blade having a leading edge at an angle to the radii of said blade assembly whereby said plasticizable materials are moved inwardly towards said axis, each said blade extending outwardly to at least the perimeter of said opposing shear faces.

14. An extruder as in claim 12 having separate adjustable means to vary the rate of flow of each plasticizable material from each said shearing gap to said common, central extrusion means.

15. An extruder as in claim 14 wherein said separate adjustable means comprise separate adjustable drive means for each said blade assembly.

References Cited

UNITED STATES PATENTS

| | | |
|---|---|---|
| 3,123,861 | 3/1964 | Westover. |
| 3,153,686 | 10/1964 | Adams. |
| 3,277,528 | 10/1966 | Nikiforov. |
| 3,355,764 | 12/1967 | Moyer. |
| 3,411,180 | 11/1968 | Ledoux. |

WILLIAM J. STEPHENSON, Primary Examiner